F. B. SPRINGER.
POTATO DIGGER.
APPLICATION FILED JUNE 21, 1918.
1,358,594.
Patented Nov. 9, 1920.
3 SHEETS—SHEET 1.
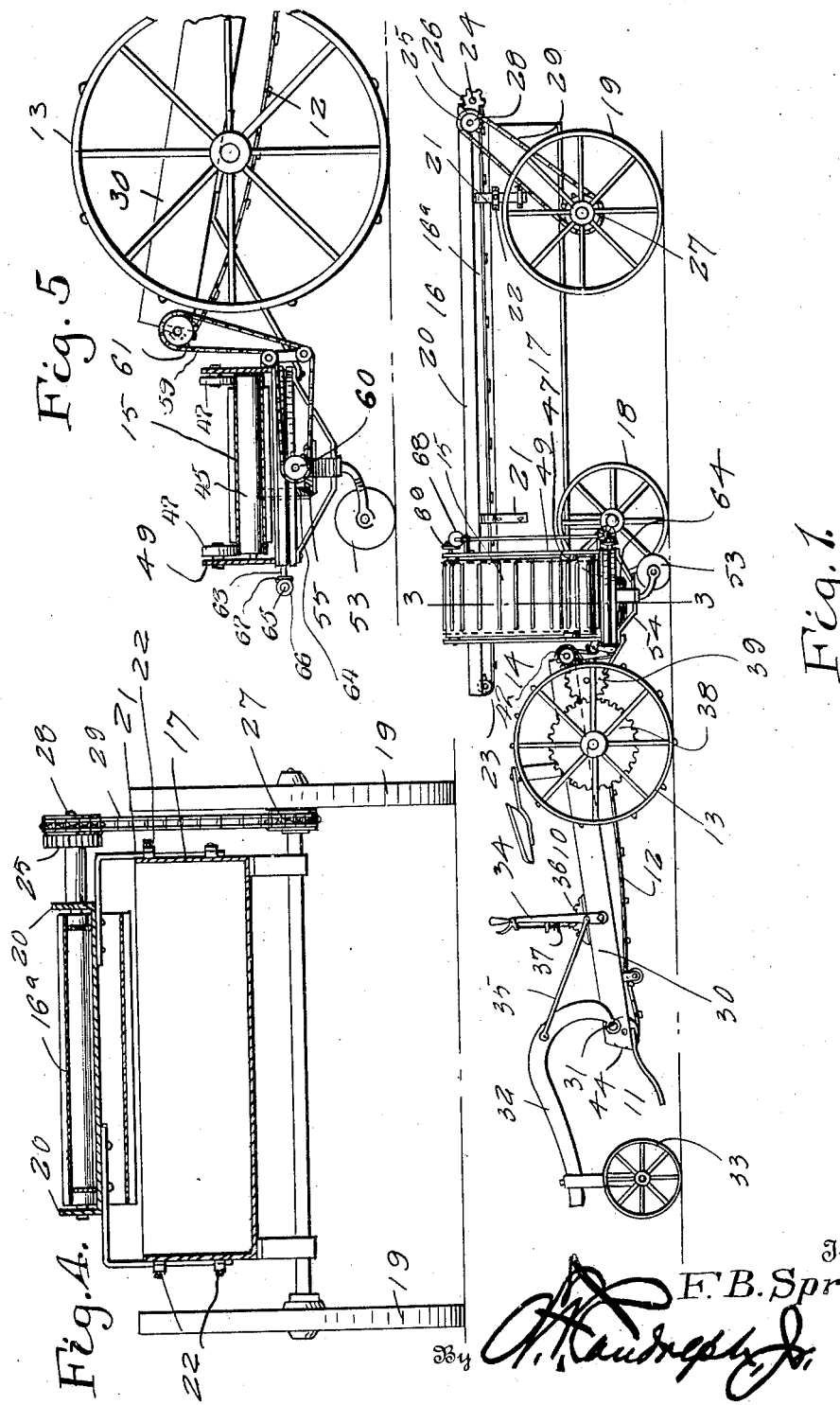
Inventor
F. B. Springer
By [signature]
Attorney

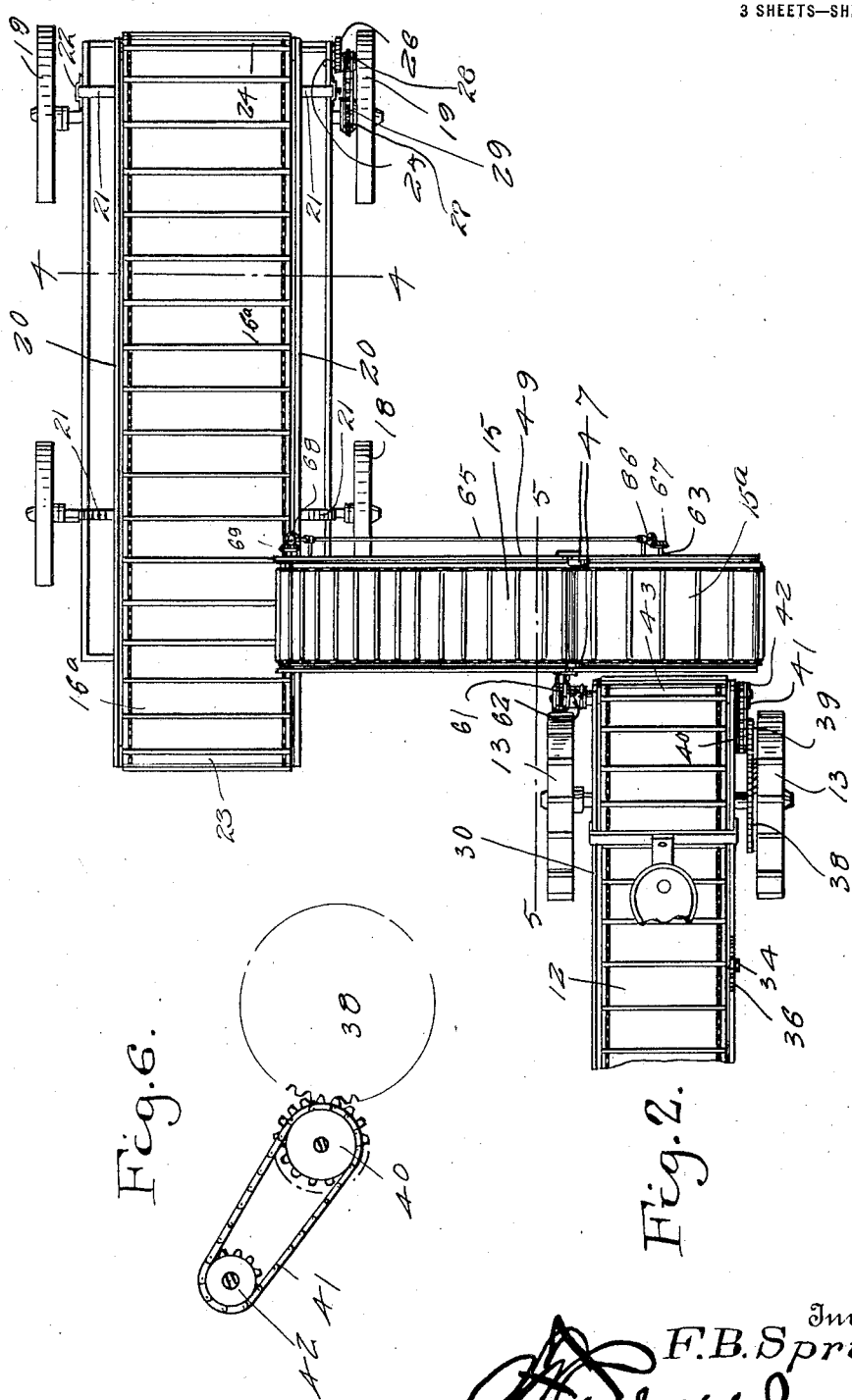

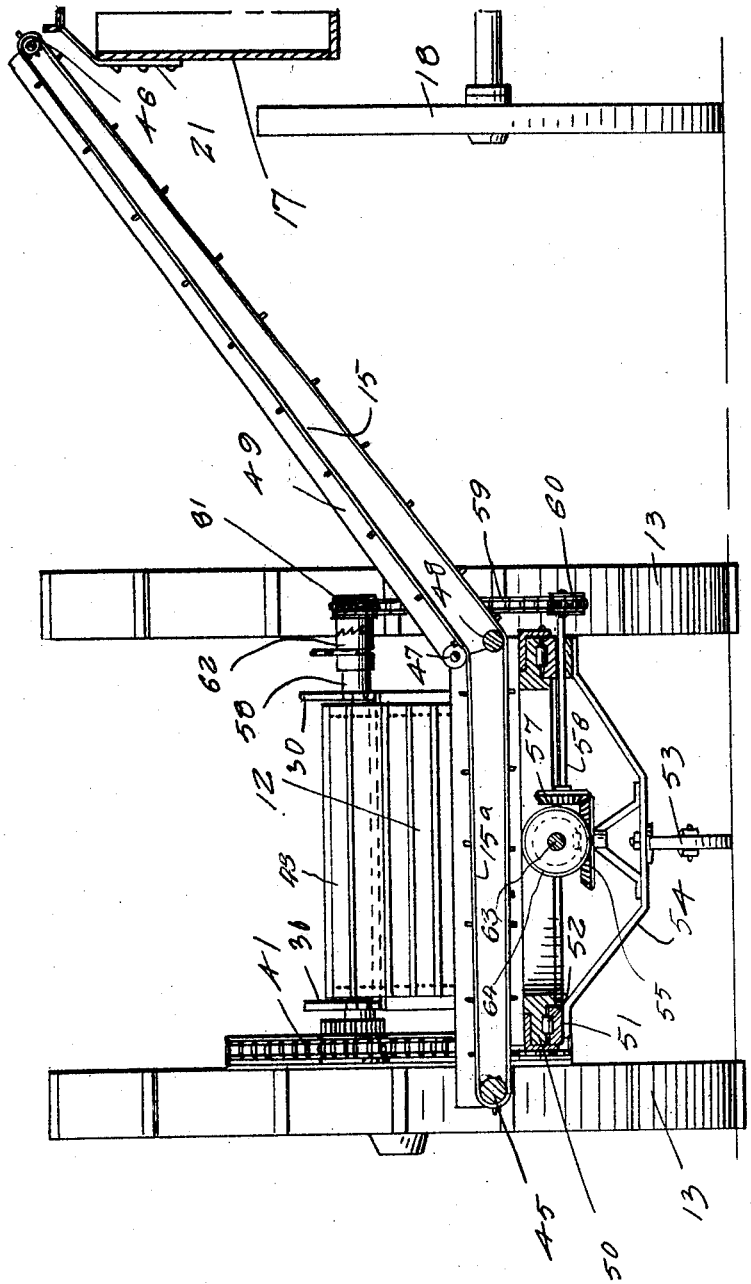

ns, the forward end of the frame 30 may
UNITED STATES PATENT OFFICE.

FRANK B. SPRINGER, OF WINDSOR, COLORADO.

POTATO-DIGGER.

1,358,594.   Specification of Letters Patent.   Patented Nov. 9, 1920.

Application filed June 21, 1918. Serial No. 241,239.

*To all whom it may concern:*

Be it known that I, FRANK B. SPRINGER, a citizen of the United States, residing at Windsor, in the county of Weld and State of Colorado, have invented certain new and useful Improvements in Potato-Diggers; and I do hereby declare the following to be a full, clear, and exact description of the invention, such as will enable others skilled in the art to which it appertains to make and use the same.

The object of the invention is to provide a potato digger of improved type whereby the harvesting of the crop may be accomplished without traversing the ground containing the crop, but merely by traversing the plowed ground, or in other words to provide a machine which will operate with reference to a row or series of rows of potatoes from a position upon the ground already harvested, the machine being adapted to follow the crop although capable of operating in either direction relative to the rows.

A further object of the invention is to provide a machine for the purpose indicated which is capable of handling the crop with increased facility and celerity and under such conditions as to simplify the separation of the potatoes from the earth and vines.

Further objects and advantages will be emphasized in the following description, it being understood that changes in form, proportion and details may be resorted to within the scope of the appended claims, without departing from the spirit of the invention.

In the drawings:

Figure 1 is a side view of a machine constructed in accordance with the invention.

Fig. 2 is a plan view of the same.

Fig. 3 is a sectional view on the plane indicated by the line 3—3 of Fig. 1.

Fig. 4 is a transverse sectional view of the receiving vehicle on the plane indicated by the line 4—4 of Fig. 2.

Fig. 5 is a sectional view on the plane indicated by the line 5—5 of Fig. 2.

Fig. 6 is a detail view showing the gearing by which motion is communicated from the ground wheel to the carrier.

The illustrated embodiment of the invention consists of a digger member 10 provided with a digger 11 and a shaker belt or carrier 12 operated by the ground or traction wheels 13, and a delivery element 14 having an endless carrier 15 for receiving the potatoes and vines from the shaker belt or carrier and conducting them to a distributing or separating element 16 consisting, for example, of an endless belt 16$^a$ arranged in operative relation with and carried by a vehicle 17 having supporting wheels 18 and 19 and adapted to be moved with the first named members of the machine and maintained in a position to receive the potatoes and vines from the discharge end of the delivery member 14. Preferably the distributing or separating belt 16$^a$ is mounted upon a frame 20 provided with standards 21 which are removably fitted in sockets formed by cleats 22 on the side walls of the wagon body 17, said belt being arranged to traverse terminal rollers 23 and 24 of which the latter receives motion through the gears 25 and 26 of which the former is actuated from the rear vehicle wheel 19 by means of sprockets 27 and 28 and the chain 29. It is the purpose to have one or more operators in attendance upon said distributing belt, to remove the potatoes therefrom and drop them into the body of the wagon as the vines, weeds and other waste material are carried rearwardly and discharged at the tail end of the wagon.

The digger 11, by which the potatoes are elevated and thrown upon the carrier 12, may be of any suitable or approved type, and in order that the extent of depression thereof may be controlled to suit the conditions, the forward end of the frame 30 may be pivotally connected as shown at 31 with the draft tongue 32 having a caster or pilot wheel 33, a hand lever 34 mounted upon said frame 30 being connected by a rod or link 35 with the draft tongue, and the lever being adapted for locking at any suitable relative adjustment of the tongue and frame by means of segment 36 and a pawl 37. The ground wheel 13 carries a gear 38 meshing with a pinion 39 carrying a sprocket wheel 40 which is connected by a chain 41 with a sprocket 42 on a drum or roller 43 which is traversed by the shaker belt or carrier 12, the lower or forward portion of the same being arranged to traverse a roller 44. Obviously during the operation of the machine the vibration of the belt or carrier 12, due to the movement of the machine, is calculated to shake a greater portion of the dirt from the potatoes so that the latter with the vines may be discharged upon the relatively horizontal receiving portion 15ª of the delivery conveyer 15, said conveyer traversing terminal rollers or drums 45 and 46 and the intermediate portions of the upper and lower flights thereof extending around direction rollers 47 and 48, said receiving portion of the conveyer being located in a plane below the delivery portion of the shaker belt or carrier 12 so that a still further agitation of the material and tendency to loosen the soil from the potatoes occurs in the discharge of the same from the shaker belt or carrier to the delivery conveyer.

The frame 49 of the delivery conveyer embodies a turntable 50 mounted upon an annular track 51, with relation to which any suitable anti-friction rollers or other devices, as shown at 52, may be employed, said support having a caster 53 mounted upon a suitable truss frame 54, a master gear 55 and a countershaft 56 provided with a pinion 57 meshing with said master gear. The countershaft is connected with the drive shaft 58, forming a continuation of the rear roller or drum 43 of the shaker belt or conveyer by means of a sprocket chain 59 traversing sprocket wheels 60 and 61 secured respectively to said counter and drive shafts, so that during the operation of the machine and of the shaker belt in reference thereto, motion is communicated to the master gear 55 through the intermediate gearing, when the clutch 62 has its members in engagement, any suitable or preferred clutch mechanism being employed and serving to permit of throwing the delivery conveyer mechanism out of operation when desired.

Mounted upon the turntable is a shaft 63 provided with a gear 64 meshing with the master gear 55, and adapted to maintain such engagement in any adjusted position of the delivery conveyer frame relative to the digger frame. This shaft 63 is operatively connected with the roll or drum 45 to communicate motion to the carrier or conveyer 15, as by means of a longitudinal shaft 65, intermeshing gears 66 and 67 between said longitudinal shaft and the shaft 63, and the bevel-gears 68 and 69 between said longitudinal shaft and the drum 46.

Thus with the digger frame operating in relation to the rows of potatoes which are being dug, the delivery conveyer may be disposed on either side of the digger frame and the potatoes thus delivered at a selected side of the digger so that the receiving vehicle may be located entirely upon the plowed ground or the portion of the field from which the potatoes have already been dug. The complete delivery conveyer may be turned upon the table mechanism provided for that purpose so as to deliver on either side of the path of the digger frame, to the end that at the end of a row the digger frame may be turned relative to the conveyer frame to progress in the opposite direction, the vehicle of course being correspondingly reversed, so that there is no time lost in retracing the path of the machine and yet the receiving vehicle may, as above noted, travel upon the plowed portion of the field.

Obviously there will be a tendency to separate any remaining soil from the potatoes during the passage thereof toward the delivery end of the conveyer 15, and as the discharge of the latter is located above the plane of the distributing or separating carrier 16ª, a further separating jar is received at this point so that it becomes a relatively simple matter to detach or separate the potatoes from the vines during the travel thereof upon the conveyer 16ª to permit of the ultimate discharge of the vines at the end of the vehicle.

Having described the invention, I claim:

1. A potato digger comprising a wheeled frame, a conveyer, operating mechanism between the wheels of said frame and said conveyer, and laterally delivering mechanism having a lateral track positioned to the rear of the wheeled frame, a frame extending transversely of the wheeled frame and including a turn table rotatably mounted upon said track, a conveyer belt mounted upon the frame and having a horizontal receiving portion located to the rear of the delivery end of the conveyer of said wheeled frame, a supporting structure for said track, a master gear carried by said supporting structure, means for transmitting rotary movement from the conveyer of the wheeled frame to the master gear including a shaft carried by the track, a gear keyed to the inner end of the shaft and meshing with the master gear and means for operating the conveyer of the transversely extending frame from the master gear including a shaft rotatably carried by the turn table and a gear carried thereby and meshing with the master gear.

2. A potato digger comprising a wheeled frame, a conveyer carried by the frame, operating means for the conveyer, and delivery mechanism extending laterally of the wheeled frame to the rear of the frame and having a base including a circular track, a conveyer frame, a turn table supporting the conveyer frame and resting upon the track for rotary movement thereon, an endless conveyer carried by the frame of the turn table, an operating mechanism for the last mentioned conveyer including a driving shaft rotated from the operating mechanism of the conveyer carried by the wheeled frame, a vertically disposed bearing supported from said track and in axial relation thereto, a master gear carried by the bearing and having operative connection with the drive shaft for receiving rotation therefrom, and means for transmitting rotary movement from the master gear to the endless conveyer of the frame carried by the turn table including a shaft rotatably carried by the turn table and having a gear at its inner end meshing with the master gear.

In testimony whereof I affix my signature in presence of two witnesses.

FRANK B. SPRINGER.

Witnesses:
G. I. RICHARDS,
W. B. MIDDLETON.